(12) United States Patent
Yeager

(10) Patent No.: US 6,418,542 B1
(45) Date of Patent: Jul. 9, 2002

(54) CRITICAL SIGNAL THREAD

(75) Inventor: William J. Yeager, Menlo Park, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/067,547

(22) Filed: Apr. 27, 1998

(51) Int. Cl.[7] ............................... H02H 3/05; G06F 7/00
(52) U.S. Cl. ........................... 714/38; 707/1; 707/8; 714/52
(58) Field of Search .................... 707/1, 8; 710/200, 710/220; 714/48, 49, 38, 52

(56) References Cited

U.S. PATENT DOCUMENTS

| | | | |
|---|---|---|---|
| 5,305,455 A | | 4/1994 | Anschuetz et al. |
| 5,555,747 A | * | 9/1996 | Rogers et al. ......... 395/200.11 |
| 5,940,827 A | * | 8/1999 | Hapner et al. .................. 707/8 |
| 6,073,131 A | * | 6/2000 | Roberti ............................ 707/7 |
| 6,119,145 A | * | 9/2000 | Ikeda et al. .................. 709/203 |
| 6,199,992 B1 | * | 1/2001 | Beall et al. .................. 707/103 |

OTHER PUBLICATIONS

Crispin, M., "Internet Message Access Protocol," *University of Washington*, (1996), pp. 1–93.

* cited by examiner

*Primary Examiner*—Peter S. Wong
*Assistant Examiner*—Tim Vo
(74) *Attorney, Agent, or Firm*—Beyer Weaver & Thomas LLP (57) ABSTRACT

A system, method, and computer-readable medium containing computer programming instructions are disclosed for allowing threads in a multi-threaded process to continue operating when a single offending thread within the process causes a critical signal and crashes. A critical signal directed to a particular multi-threaded process resulting from the execution of an offending thread in the process is handled by a critical signal thread. The critical signal thread is invoked when the process receives a critical signal and prevents the entire process from shutting down because of one bad thread in the process. The critical signal thread terminates the resources and connections associated with the offending thread. It does this without effecting the performance of other non-offending threads in the process thereby preventing the termination of other connections in the process because of illegal or invalid operations of a single thread.

47 Claims, 4 Drawing Sheets

CRITICAL SIGNAL THREAD

This application is related to U.S. patent application Ser. Nos. 09/067,537, filed on the same date herewith and commonly assigned, entitled "HIGH PERFORMANCE MESSAGE STORE," 09/067,497, filed on the same date herewith and commonly assigned, entitled "METHOD AND APPARATUS FOR HIGH PERFORMANCE ACCESS TO DATA IN A MESSAGE STORE", 09/067,546, filed on the same date herewith and commonly assigned, entitled "METHOD AND APPARATUS FOR DETECTING INPUT DIRECTED TO A THREAD IN A MULTI-THREADED PROCESS," which are incorporated herein by reference.

BACKGROUND OF THE INVENTION

1. Field of the Invention

The present invention relates generally to the field of computer software and client/server applications. In particular, it relates to operating system software running in a distributed computing environment for managing connections between a client and a server.

2. Discussion of Related Art

In multi-threaded operating systems, threads are generally contained and run within processes. Threads within a process can share resources and memory allocated to the process. With present systems, when a thread executing within a process crashes, the entire process is terminated. That is, all the connection threads within that process are terminated, resulting in an abrupt and damaging closing of connections, typically with end users. This problem occurs even if there is no association or relationship between the process that crashed and the other threads in the process.

Although results of a thread crashing can vary, the results are nearly always undesirable and can cause significant damage to an end user such as loss of data. For example, in a PC running under the Windows® operating environment or in a Macintosh® computer running under the Macintosh Operating System, a thread crashing typically causes the entire operating system to shut down, or if the thread crashes on a network server, brings down the entire network. These are undesirable consequences. The fact that an entire multi-threaded process can be terminated from a single thread (out of potentially hundreds of threads in the process) crashing for reasons completely unrelated to the other threads makes the operating system under which the process is running brittle and less stable then would be otherwise desired. Unix based systems handle thread crashes more smoothly. Although the process running the crashing thread is terminated, it does not typically bring down the entire operating system. The system keeps running although all the connections implemented by threads in that process are still abruptly terminated.

A thread crashes when it receives a critical signal from the operating system. The operating system is told to send a critical signal typically by the computer system hardware. Specific signals have specific meanings in the system. Some are ignored by the process and others are caught and handled by the process. When a signal is ignored by a process that contains the thread that caused the signal, the process dies and a core file, a snapshot of the process at the time of the crash (described below) is made by the operating system. When a signal is caught by the process, the process can handle the signal or, if the signal is a critical signal, the process will shut down. In some cases, the process ignores critical signals because the signals indicates that the internal state of the process has been corrupted. The operating system realizes that the process ignored the signal and shuts down the process. The operating system creates a core file which contains the state of all the threads in the process when the process was shut down. It is essentially a snapshot of the process that can be examined to determine what the crashing thread attempted to do that caused the thread to crash.

Therefore, it would be desirable to have processes that can handle critical signals directed to a thread in the process and not have the entire process, which possibly has other threads running in it, terminate. It would be desirable to allow the other threads in the process to continue functioning and have only the thread that crashed, its resources cleaned up in an orderly manner terminate, and the end user informed that the connection has been closed because of a particular error.

SUMMARY OF THE INVENTION

To achieve the foregoing, and in accordance with the purpose of the present invention, methods, apparatus, and computer readable medium are disclosed that allow threads in a multi-threaded process to continue executing when a single thread within the process receives a critical signal and crashes. In one aspect of the present invention, a method is provided in which a critical signal directed to a particular multi-threaded process resulting from the execution of a particular thread in the process is handled by a critical signal thread. The critical signal thread is invoked when the process receives a critical signal and prevents the entire process from shutting down because of one bad thread in the process. The critical signal thread terminates the resources and connections associated with the offending thread. It does this without effecting the performance of other non-offending threads in the process thereby preventing the termination of other connections in the process because of illegal or invalid operations of a single thread.

In one embodiment the critical signal thread is initialized by registering particular signals thereby enabling the critical signal thread to detect those signals. In yet another embodiment, a module or function within the critical signal thread called the critical signal handler is invoked to handle registered signals. In yet another embodiment, the critical signal thread reads a signal queue maintained by the operating system in order to process an incoming critical signal.

In another aspect of the present invention, a method of terminating resources and connections associated with an offending thread is described. The critical signal handler closes files opened only by the offending thread and unlocks or marks as unlocked any files locked by the offending thread. In one embodiment an informational message is sent to the client informing the client that the connection has been terminated. In yet another embodiment all references to the offending thread and all memory associated with the offending thread are cleared or deleted. In yet another embodiment an input polling thread contained within the process is instructed to discontinue polling for input events directed to the offending thread. In yet another embodiment a core file of the process is made at the time it receives the critical signal even though the entire process is not shut down.

In another aspect of the present invention, a method of maintaining a multi-threaded process when a thread within the process crashes is described. A data space for each thread in the process is organized such that each data space is substantially independent from the other data spaces. Signals from the operating system directed to an offending thread are processed by executing a crash thread in the process. The offending thread is terminated thereby releasing system resources and clearing connections associated with the offending thread. The method allows the other threads in the multi-threaded process to continue functioning thereby preventing termination of the entire process.

In one embodiment the data space for each thread includes a plurality of private structures internal to the thread that allow the thread to maintain a reduced amount of stale data. In yet another embodiment the multi-threaded process registers critical signals when the process is invoked thereby allowing detection of critical signals by the process. In yet another embodiment the offending thread is terminated by deleting all references in memory to the offending thread, closing all files associated with the offending thread, and terminating all connections associated with the offending thread.

In another aspect of the present invention a computer system having a multi-threaded process capable of executing active connection threads where the system is arranged such that when a critical signal is generated for an offending thread, other threads continue operating within the process is described. A critical signal thread detects critical signals generated by the operating system and handles termination operations for an offending thread. This is done without requiring that the entire process be terminated in response to the detected critical signal. A signal handler contained in the critical signal thread deletes references to the offending thread in response to the critical signal and causes operations between the offending thread and files in the computer system to discontinue. This is done while allowing other active connection threads within the process to continue operating.

In one embodiment the system includes a signal register for registering critical signals thereby enabling the critical signal thread to detect and process critical signals. In yet another embodiment the system includes a memory shared by multi-threaded process in the system which contains information on each thread in the plurality of threads. In yet another embodiment the system includes an input polling thread in the process which is instructed by the critical signal thread to discontinue polling for input events directed to the offending thread.

BRIEF DESCRIPTION OF THE DRAWINGS

The invention, together with further advantages thereof, may best be understood by reference of he following description taken in conjunction with the accompanying drawings in which.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A method and computer system apparatus for allowing a multi-threaded process to continue functioning when a thread within the process crashes is illustrated in the various drawings. As mentioned above, an operating system can contain several processes and each process can have many threads. An active thread is typically performing a specific task, such as accessing data in a message store according to a user request or printing a document. The tasks and connections implemented by threads in a process are not necessarily related and can, in fact, be disparate, having no connections or interdependencies among them. Nevertheless, when a thread within a process crashes, the entire process is brought down, and in some instances, the entire operating system. Thus, all connections and tasks that were being implemented by the threads are abruptly terminated, even though they had no relationship to the thread that crashed other than happening to be in the same process.

A thread typically crashes by attempting to do something illegal. Most illegal operations fall into one of two categories: illegal instructions or illegal memory access. An illegal instruction is simply one where a thread attempts to perform an illegal or impossible operation. An illegal memory access occurs when a thread attempts to access data in memory it is not allowed to access or does not exist. Generally, data corresponding to a thread resides in either text space or data space. Text space is protected, i.e. read only, and contains the code or programming instructions that make up the thread. The data space is read/write and contains memory addresses corresponding to data used by the thread. Thus, an illegal memory access error can occur if the data space is modified such that a particular address points to illegal or nonexistent data. When an error occurs, the operating system generates a copy of a core file that shows the execution context of the process. This core file is examined to determine what instruction (e.g. the thread attempted to divide a value by 0) or broken address caused the thread to crash.

As described above, when an illegal instruction or illegal memory access occurs, the hardware informs the operating system which, in turn, sends a critical signal to the offending thread within the process. At this stage the process either ignores or handles the signal. Some signals are not critical and allow the process to terminate in an orderly way. These signals are typically handled by the process. Critical signals are typically ignored by the process and, therefore, shut down the process.

As mentioned, a thread is the implementation of a specific task within the system. For example, in the described embodiment, a thread represents a client connection. Following this example, the client connection can be to a mail message store on a server in which the user wants to access mail messages. An active connection in this context represents a user session to a message store in a large network. In this environment, a parent process or access daemon that receives user requests to access a mail message store manages several child processes, each containing typically many active connection threads. This configuration of the described embodiment is shown in FIG. 1.

Figure 1:
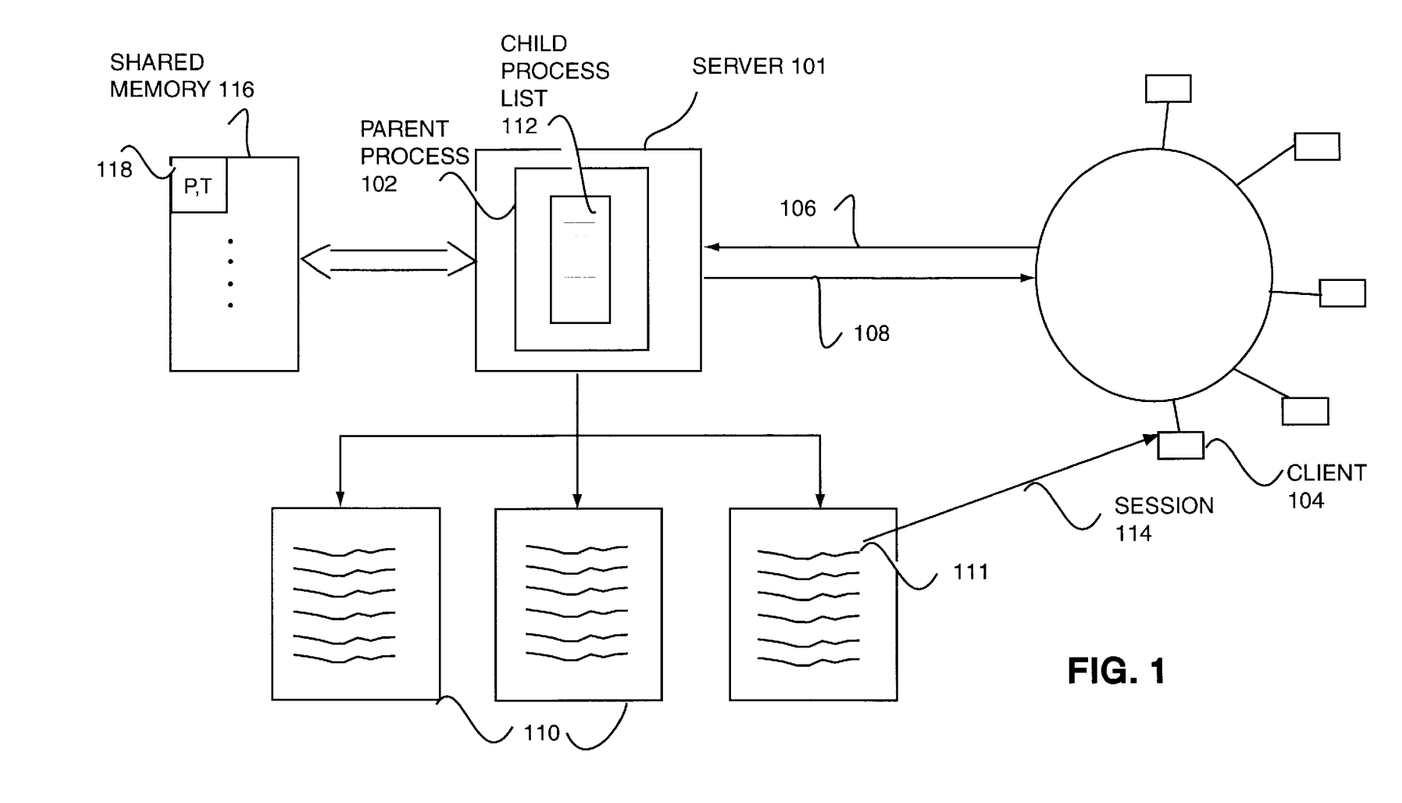
FIG. 1 is a block diagram showing various components of a message access configuration and method in accordance with one embodiment of the present invention.

FIG. 1 is a block diagram showing various components of a message access configuration and method in accordance with one embodiment of the present invention. In the described embodiment, the messages stored and accessed are Internet e-mail messages. An Internet Message (IM) access daemon 100 resides on a network mail server, such as an IMAP server which may also contain a message store. An example of an IMAP message store used to store messages and index information which may be used with the present invention is described in co-pending MESSAGE STORE application, the entire specification of which is incorporated herein by reference. A parent process 102 within daemon 100 is responsive to data (typically commands or requests to connect) sent from clients 104. Requests to connect 106 from clients are stored in a queue and are received by the server at a port depending on the protocol in which the request is being made. Once the server responds to a request 106, a connection 108 with a client is established and the client can begin sending data, such as commands for accessing and manipulating mail.

The parent process 102 has control of several concurrently operating child processes 110. It maintains a list of child processes 112 under its control. Each child process 110 has several threads of various types that can be in one of several states. In the described embodiment, there are 50 to 200 threads in each child process. Once a connection is established between a client and a server, a session is established between a thread and that client, shown at line 114.

In the described embodiment, a child process, a thread, and a connection associated with that thread each have a number or identifier. This information is stored in a shared memory 116, having a series of data cells 118, that can be read and updated by all child processes. The shared memory 116 is useful because typically child processes are not aware of each other's existence and cannot communicate. In other preferred embodiments, a shared memory may not be needed if child processes are able to communicate directly. In the described embodiment, as soon as a child process is created, shared memory cells 118 associated with that child process are allocated by the parent process. In other preferred embodiments the shared memory may be allocated by the child process itself or by other entities in the operating system.

Once a thread is created within a child process, a thread-specific data cell 118 is assigned to that thread. In the described embodiment, this shared memory 116 is created and pre-allocated by the parent process when the server is activated. In other preferred embodiments, the shared memory 116, if needed, can be created by other entities in the operating system. As mentioned, the shared memory is made up of a series of data cells. These cells 118 are identified by a coordinate "i" corresponding to a process and a coordinate "j" corresponding to a thread within that process. Thus, cell $(P_i, T_j)$ is a thread-specific data cell, which also contains a connection number "k," that allows one thread to inform other threads of its actions, such as updating a mailbox or copying messages from a mailbox. The thread-specific data cells 118 of the described embodiment allow a thread to inform all other threads under the same parent process of that thread's actions. Thus, the shared memory resides on the server and is pre-allocated and controlled by a parent process once the parent process is invoked.

In prior art systems, if a single thread crashes in the process, for example, as a result of a user attempting to access a nonexistent memory address, all other user connections, which are very likely not effected at all by the offending thread's activities, will terminate. The other user connections are implemented through active connection threads. These threads, including the offending thread, are composed of private structures, such as string spaces and other data spaces. The activities of a thread rarely step outside of it's private structure. Thus, there is essentially a firewall type confinement around each thread that prevents it from effecting the private structure of other threads in the process. In the described embodiment, this firewall property is further enhanced by the reduced amount of stale or unused data that is kept by each thread. Stale data in memory is cleared as soon as possible to reduce the possibility that a thread's data space (even if unused) will not be inadvertently referenced by another thread in the process. As illustrated in the message store example, it is unnecessary and undesirable that the other connections in the child process abruptly terminate when the users' activities on those threads are valid and unaffected by the offending thread's activities. The message store is but one example of an environment in which a user connection represented by thread exists in a process with many other unrelated threads. In other preferred embodiments, a thread can represent a "job" (as in an IBM mainframe environment) or a specific system function.

A common feature found in all threads is a context. That is, an executing thread has a context defined by its data space and text space. The contexts of threads running in a process are substantially separate from each other as to not affect one another if the context of one thread is found to be corrupt. Information on a thread's context is contained in the access daemon's shared memory, such as shared memory 116 of FIG. 1, and in the process that contains the thread. When a thread crashes, the critical signal thread allows the process to catch the signal and determine which thread caused it. As is discussed in greater detail below, signals are placed in a queue by the operating system and routed to the appropriate process. The process then begins operations to handle the critical signal and terminate the offending thread.

Figure 2:
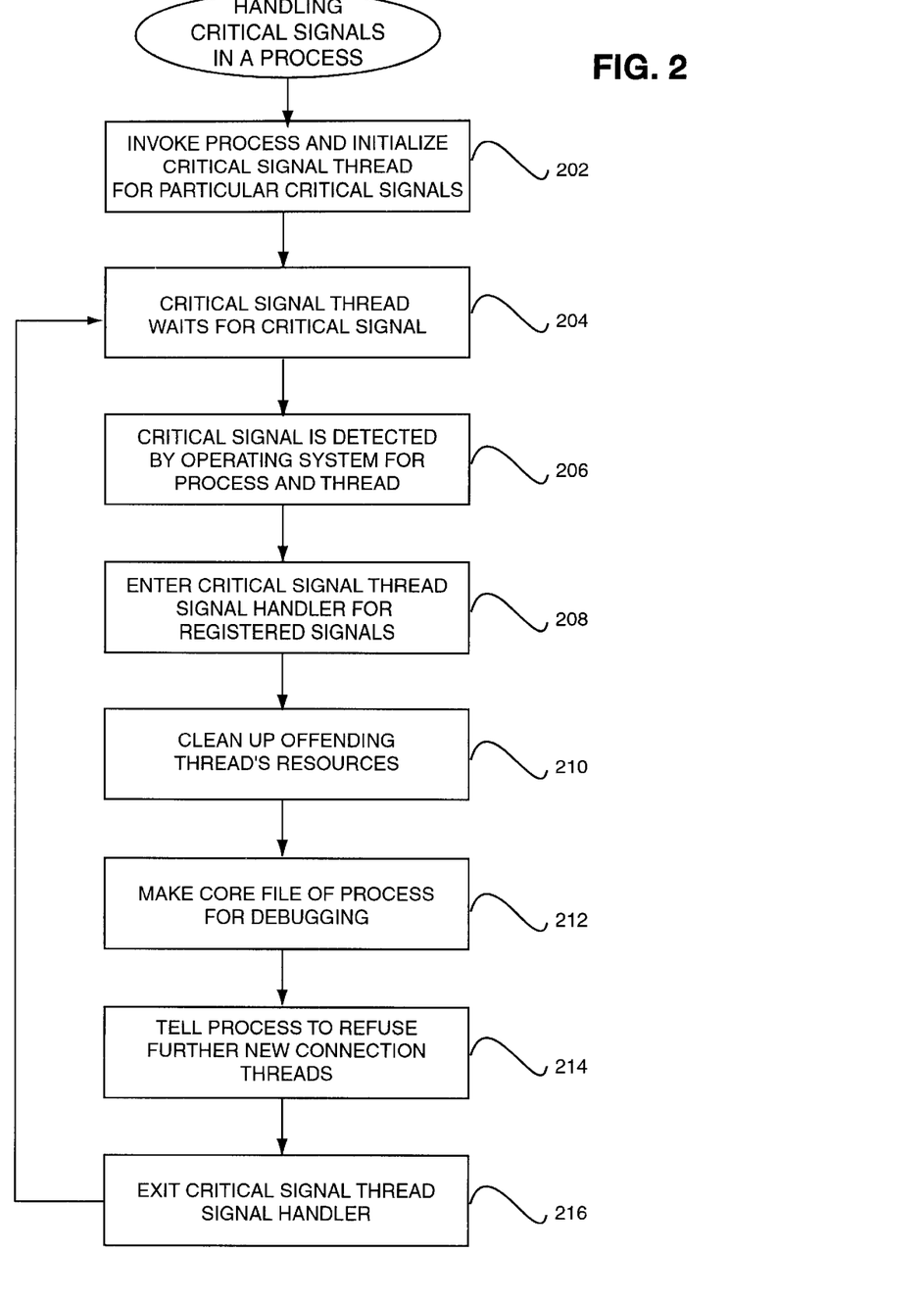
FIG. 2 is a flowchart showing a method of terminating an offending thread in a process without terminating the entire process in accordance with one embodiment of the present invention.

FIG. 2 is a flowchart showing a method of terminating an offending thread in a process without terminating the entire process in accordance with one embodiment of the present invention. At step 202 a process is executed and a critical signal thread associated with the process is initialized. When the process is started, it registers certain signals that it will catch and process. These signals include normal processing signals and critical signals that indicate an interrupt. For example, in the Solaris Operating System from Sun Microsystems, signals 10 and 11 are critical signals or interrupts indicating an illegal instruction and illegal memory access. When a signal is registered by a process at start time, the critical signal thread is enabled to handle that signal. Thus, at process start-up, the critical signal thread is enabled to catch any critical signals registered by the process. With previous systems, the process ignored critical signals and caught only normal or non-disruptive signals. When the signal is ignored, the operating system terminates the process. In the described embodiment, the signals are registered by the process and the critical signal thread is notified to catch those signals.

Once the process and signal handling process are initialized, the critical signal thread is enabled and waits for a critical signal caused by an active thread in the process in step 204. In the described embodiment, the critical signal thread has a light weight process or similar execution enabler assigned to it which allows it to remain in an active wait state in which it can detect or catch critical signals. At step 206 the operating system is alerted of an illegal instruction or illegal memory access from the hardware. As mentioned above, the hardware first detects that an illegal operation or activity was attempted by a particular thread. The hardware component informs the operating system which then determine which process and thread caused the signal.

The critical signal thread has several function calls it can make during its execution. In the described embodiment, one such function is known as the critical signal handler. The signal handler is a portion of code of the critical signal thread that handles the incoming registered signal. In other preferred embodiments, the critical signal thread can contain more than one critical signal handler for handling different types of critical signals. As mentioned above, in the Solaris Operating System signals 10 and 11 are critical signals that are handled by the same signal handler. In other preferred embodiments, there may be more than one signal handler for handler such signals. At step 208, the critical signal handler is invoked. When a signal is received by the crash thread from a signal queue maintained by the operating system, the thread calls the appropriate registered signal handler for handling the incoming critical signal. In other preferred embodiments, the critical signal thread need not make a separate function call to invoke an appropriate signal handler. The thread can be programmed or initialized to handle only one type of critical signal, thereby making a separate function call unnecessary.

Once the signal handler function has been called, the thread begins cleaning up the offending thread's resources. In the described embodiment, this is done by calling another function of the crash thread referred to as thread clean-up. This is done at step 210. The critical signal thread has access to shared memory and can determine which functions need to be called. The process of cleaning up an offending thread's resources is discussed in greater detail in FIG. 3. The significant point of this step is that only the offending thread's resources and data are cleaned up (in a comparatively orderly manner) instead of abruptly shutting down the entire process and terminating all the threads within the process. Referring to the message store context discussed above, a child process having a critical signal thread would be able to methodically close all of an offending thread's resources, send a meaningful message to the end user, and allow all other users accessing mail in the message store to continue.

At step 212 the system makes a copy of a core file of the process showing the state of the process at the time the offending thread crashed. As is well known to a person of ordinary skill in the computer programming arts, a core file is essentially a snapshot of the process at the time of the crash. It allows a programmer to examine what the state of the thread and associated memory was when it crashed thereby determining precisely what instruction or memory access caused the critical signal. Core files or dumps have been used for many years for this reason. In the described embodiment, the system places a limit on the number of core files that can be stored in memory at any given time since core files are typically very large files. Once the core file has been copied for debugging, the system instructs the process to not accept any new connection threads at step 214. In the described embodiment, this is done only as a safeguard because the system assumes that the process, while still functional, may be in a fragile state having had one of its threads crash. Thus, it keeps the process from accepting new connections to avoid the risk of an error occurring with respect to any new connections. In other preferred embodiments, this safeguard may not be necessary.

At step 216 the system exits the critical signal handler portion of the crash thread that it had entered in step 208. By exiting the critical signal handler code, the thread is enabled to catch and process other incoming critical signals. In the described embodiment, incoming signals are stored in a queue while the current critical signal is being processed. The system must exit the critical signal handler in order to process the next signal in the queue. Once the critical signal handler has been exited, the critical signal thread returns to waiting for, if necessary, the next critical signal, as initially shown in step 204. The process continues in this loop as long as the process is executing.

Figure 3:
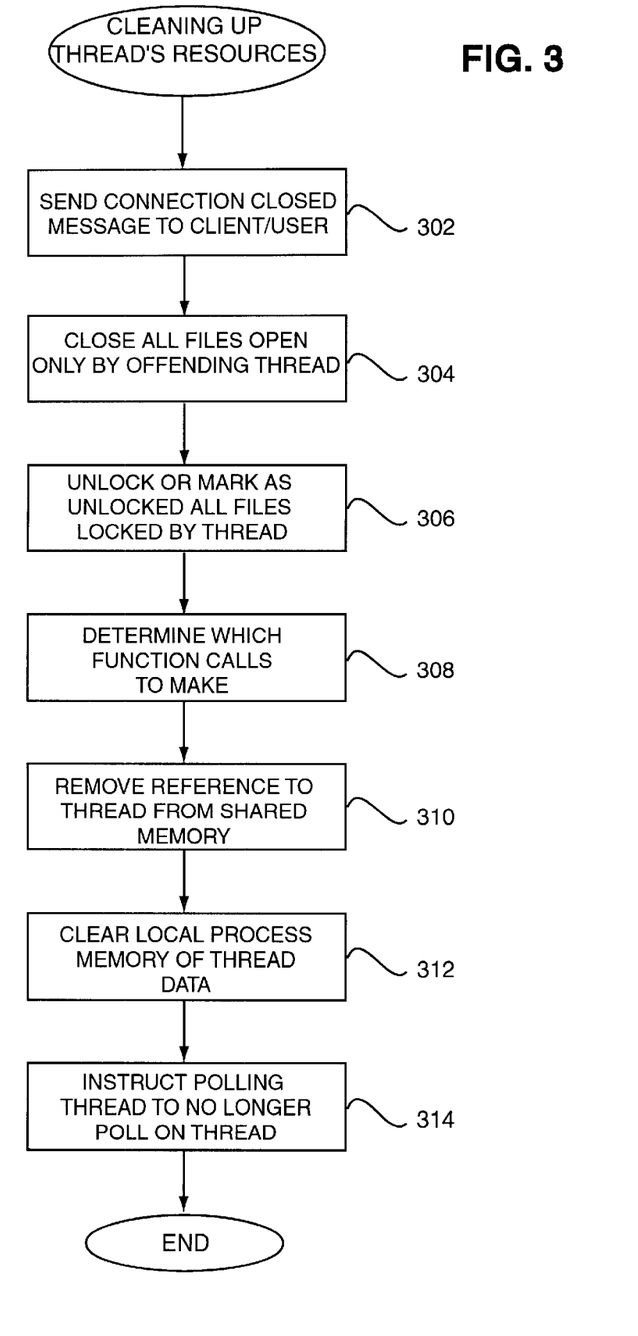
FIG. 3 is a flowchart showing step 210 of FIG. 2 in greater detail in accordance with one embodiment of the present invention.

FIG. 3 is a flowchart showing step 210 of FIG. 2 in greater detail in accordance with one embodiment of the present invention. Specifically, it shows a method of terminating and cleaning up an offending thread's resources by the critical signal handler code of the critical signal thread. The signal handler sends a message to the client, typically an end user but can be another component of the system, indicating that the connection has been closed. In other preferred embodiments, the message can include text that indicates why the connection was terminated and that the system is closing all resources associated with the connection in an orderly fashion. At step 304 the critical signal handler causes all files open only by the offending thread to be closed. If the files are also opened by other threads, the files are not closed.

At step 306 the critical signal handler either unlocks or marks as unlocked all files that the thread had a lock on. The signal handler makes the appropriate function calls to ensure that this occurs. If a file is locked by other threads, the system will mark the file as unlocked so that it appears from the offending thread's perspective that the file is locked, although it is still open. In other preferred embodiments, this marking may not be necessary given that the offending thread is being terminated so that it's perspective is not relevant to the system. However, in the case that the offending thread has the only lock on a particular file, the lock is removed when the thread is terminated so that other threads (i.e. connections) can access the file.

At step 308 the critical signal handler determines which function calls to make in order to clean up the thread's remaining resources. Since the critical signal thread has access to all the data in shared memory, it can determine which function calls are necessary for cleaning up a particular thread's resources. At step 310 the critical signal handler causes the system to remove all references to the thread from the shared allocated memory 116, as shown in FIG. 1. Each thread has a thread-specific data cell 118 in the shared memory 116 which must be removed along with any other references in other cells to the offending thread. In addition to the shared memory (used primarily for inter-process communication), the critical signal handler causes the system to clear all local memory in the process containing the offending thread at step 312. This process-local memory is used by the process to hold information on its own active threads and to allow threads within it to communicate if necessary. At step 314, an input polling thread is instructed to no longer poll on the offending thread. The input polling thread is described in greater detail in co-pending application Ser. No. 09/067,546, entitled "METHOD AND APPARATUS FOR DETECTING INPUT DIRECTED TO A THREAD IN A MULTI-THREADED PROCESS," which is incorporated herein by reference. In the described embodiment, a process has an input polling thread that detects and routes input events directed to the process to the appropriate thread in the process and eliminates the need for each thread in the process to be actively looking for input events directed to it. In other preferred embodiments, the process does not contain an input polling thread making this step unnecessary. Once the input polling thread, if one exists, is informed of the thread's termination, the cleaning up process is complete.

As discussed above, the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered, however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general purpose computers may be used with programs written in accordance with the teachings herein, or, alternatively, it may be more convenient to construct a more specialized computer system to perform the required operations.

Figure 4:
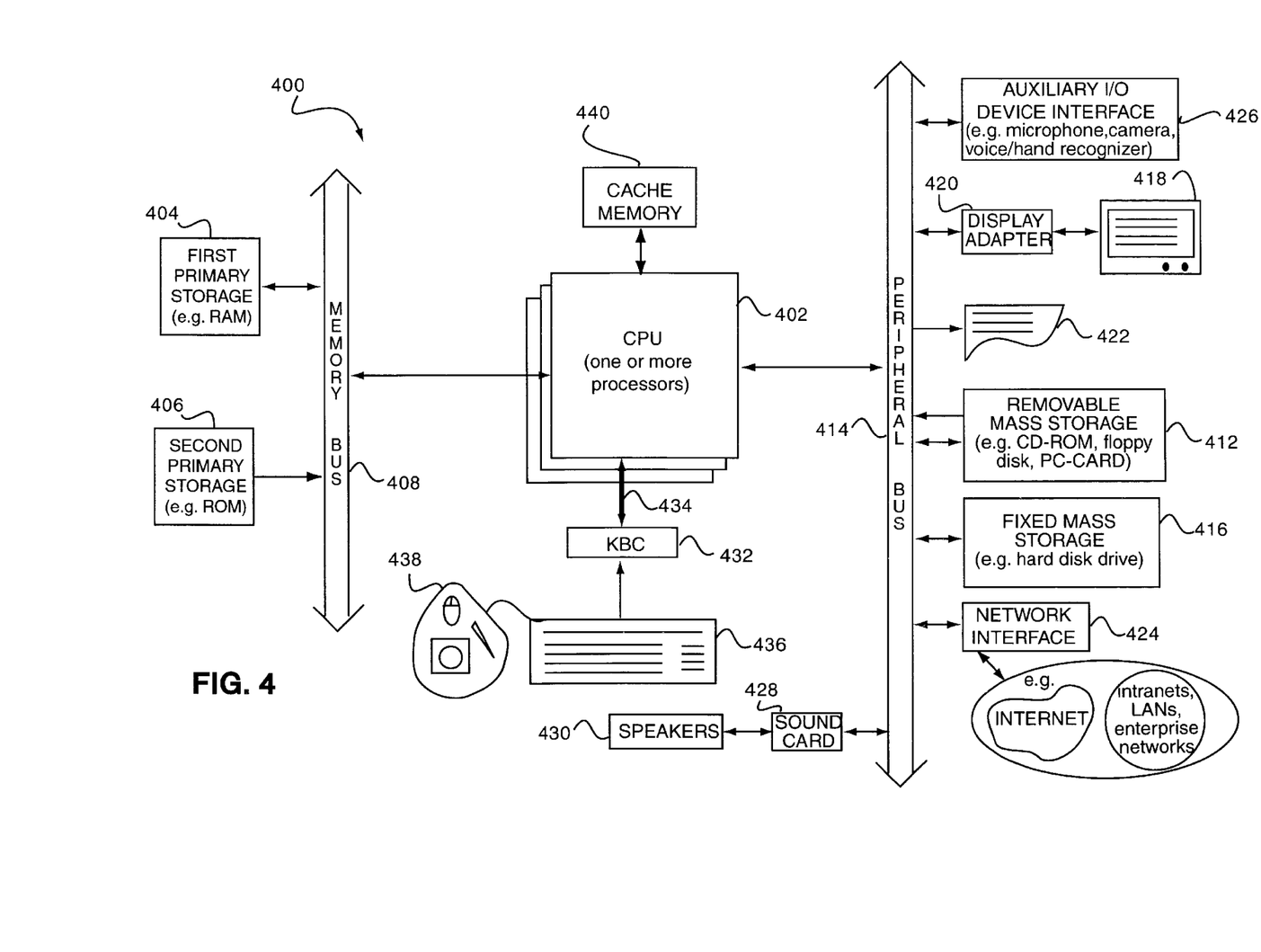
FIG. 4 is a block diagram of a general purpose computer system suitable for carrying out the processing in accordance with one embodiment of the present invention.

FIG. 4 is a block diagram of a general purpose computer system 400 suitable for carrying out the processing in accordance with one embodiment of the present invention. FIG. 4 illustrates one embodiment of a general purpose computer system. Other computer system architectures and configurations can be used for carrying out the processing of the present invention. Computer system 400, made up of various subsystems described below, includes at least one microprocessor subsystem (also referred to as a central processing unit, or CPU) 402. That is, CPU 402 can be implemented by a single-chip processor or by multiple processors. CPU 402 is a general purpose digital processor which controls the operation of the computer system 400. Using instructions retrieved from memory, the CPU 402 controls the reception and manipulation of input data, and the output and display of data on output devices.

CPU 402 is coupled bi-directionally with a first primary storage 404, typically a random access memory (RAM), and uni-directionally with a second primary storage area 406, typically a read-only memory (ROM), via a memory bus 408. As is well known in the art, primary storage 404 can be used as a general storage area and as scratch-pad memory, and can also be used to store input data and processed data. It can also store programming instructions and data, in the form of message stores or shared allocated memory holding thread-specific data cells, in addition to other data and instructions for processes operating on CPU 402, and is used typically used for fast transfer of data and instructions in a bi-directional manner over the memory bus 408. Also as well known in the art, primary storage 406 typically includes basic operating instructions, program code, data and objects used by the CPU 402 to perform its functions. Primary storage devices 404 and 406 may include any suitable computer-readable storage media, described below, depending on whether, for example, data access needs to be bi-directional or unidirectional. CPU 402 can also directly and very rapidly retrieve and store frequently needed data in a cache memory 410.

A removable mass storage device 412 provides additional data storage capacity for the computer system 400, and is coupled either bi-directionally or uni-directionally to CPU 402 via a peripheral bus 414. For example, a specific removable mass storage device commonly known as a CD-ROM typically passes data uni-directionally to the CPU 402, whereas a floppy disk can pass data bi-directionally to the CPU 402. Storage 412 may also include computer-readable media such as magnetic tape, flash memory, signals embodied on a carrier wave, PC-CARDS, portable mass storage devices, holographic storage devices, and other storage devices. A fixed mass storage 416 also provides additional data storage capacity and is coupled bi-directionally to CPU 402 via peripheral bus 414. The most common example of mass storage 416 is a hard disk drive. Generally, access to these media is slower than access to primary storages 404 and 406. Mass storage 412 and 416 generally store additional programming instructions, data, and the like that typically are not in active use by the CPU 402. It will be appreciated that the information retained within mass storage 412 and 416 may be incorporated, if needed, in standard fashion as part of primary storage 404 (e.g. RAM) as virtual memory.

In addition to providing CPU 402 access to storage subsystems, the peripheral bus 414 is used to provide access other subsystems and devices as well. In the described embodiment, these include a display monitor 418 and adapter 420, a printer device 422, a network interface 424, an auxiliary input/output device interface 426, a sound card 428 and speakers 430, and other subsystems as needed.

The network interface 424 allows CPU 402 to be coupled to another computer, computer network, or telecommunications network using a network connection as shown. Through the network interface 424, it is contemplated that the CPU 402 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 402 can be used to connect the computer system 400 to an external network and transfer data according to standard protocols. That is, method embodiments of the present invention may execute solely upon CPU 402, or may be performed across a network such as the Internet, intranet networks, or local area networks, in conjunction with a remote CPU that shares a portion of the processing. Additional mass storage devices (not shown) may also be connected to CPU 402 through network interface 424.

Auxiliary I/O device interface 426 represents general and customized interfaces that allow the CPU 402 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 402 is a keyboard controller 432 via a local bus 434 for receiving input from a keyboard 436 or a pointer device 438, and sending decoded symbols from the keyboard 436 or pointer device 438 to the CPU 402. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 408, peripheral bus 414, and local bus 434 are illustrative of any interconnection scheme serving to link the subsystems. For example, a local bus could be used to connect the CPU to fixed mass storage 416 and display adapter 420. The computer system shown in FIG. 4 is but an example of a computer system suitable for use with the invention. Other computer architectures having different configurations of subsystems may also be utilized.

Although the foregoing invention has been described in some detail for purposes of clarity of understanding, it will be apparent that certain changes and modifications may be practiced within the scope of the appended claims.

Furthermore, it should be noted that there are alternative ways of implementing both the process and apparatus of the present invention. For example, although the usefulness of the critical signal thread has been described in the context of processes in a message store, they are useful in other multi-threaded contexts where it would be very undesirable and unnecessary to shut down an entire process because of one offending thread. In another example, the process containing the offending thread can accept new connections after the offending thread has been terminated. In yet another example, the critical signal thread can have more than one section of code, such as the critical signal handier in the present invention, function together to handle or process critical signals. Accordingly, the present embodiments are to be considered as illustrative and not restrictive, and the invention is not to be limited to the details given herein, but may be modified within the scope and equivalents of the appended claims.

What is claimed is:

1. A method of handling a critical signal resulting from the execution of a thread in a multi-threaded process having a critical signal thread, the method comprising:

detecting a critical signal caused by the thread in the multi-threaded process;

invoking the critical signal thread to handle the critical signal caused by the thread; and terminating by the critical signal thread resources and connections associated with the particular thread that caused the critical signal without terminating resources and connections of other threads in the multi-threaded process that were not associated with the critical signal;

whereby the other threads in the multi-threaded process are unaffected by the critical signal and resulting termination of the resources and connections of the thread, thereby allowing other threads in the multi-threaded process to remain functional.

2. A method as recited in claim 1 further including initializing the critical signal thread such that particular signals are recognized by the multi-threaded process.

3. A method as recited in claim 1 wherein invoking the critical signal thread further includes executing a critical signal handler wherein the critical signal handler is a module in the critical signal thread.

4. A method as recited in claim 1 wherein invoking the critical signal thread further includes reading a signal queue maintained by an operating system.

5. A method as recited in claim 1 wherein terminating resources and connections associated with the thread further includes:

closing files opened by the thread;

unlocking files locked by the thread; and sending an informational message to a client.

6. A method as recited in claim 1 wherein terminating resources and connections associated with the thread further includes deleting references to the thread in a shared memory and clearing memory associated with the multi-threaded process of references to the thread.

7. A method as recited in claim 1 wherein terminating resources and connections associated with the thread further includes instructing a polling thread contained in the multi-threaded process to store polling on the thread.

8. A method as recited in claim 1 that further includes refusing activation of new threads in the multi-threaded process after the thread has caused the critical signal.

9. A method as recited in claim 1 that further includes making a core file of the multi-threaded process at the time the thread caused the critical signal.

10. The method as recited in claim 1, wherein the critical signal is sent in response to a signal received from computer hardware associated with an operating system.

11. The method as recited in claim 1, wherein the critical signal is received by the thread from an operating system.

12. The method as recited in claim 1, wherein the critical signal thread determines from the critical signal that the critical signal thread should terminate resources and connections associated with the particular thread that caused the critical signal.

13. The method as recited in claim 1, wherein the multi-threaded process is performed in a multi-threaded operating system.

14. The method as recited in claim 1, wherein the critical signal is caused only by the thread in the multi-threaded process.

15. The method as recited in claim 1, wherein the critical signal is not caused by threads other than the thread in the multi-threaded process.

16. A method as recited in claim 2 wherein initializing the critical signal thread further includes registering operating system signals as critical signals thereby enabling the critical signal thread to detect the registered operating system signals.

17. A method as recited in claim 3 further including exiting the critical signal handler thereby allowing the critical signal thread to process a next incoming critical signal.

18. The method as recited in claim 12, further comprising:
closing a file opened by the thread if the file is not opened by other threads.

19. The method as recited in claim 12, further comprising:
marking a file as unlocked if the file was locked by the thread and the file was not locked by other threads.

20. The method as recited in claim 12, wherein the critical signal handler instructs an input polling thread to no longer poll the thread.

21. The method as recited in claim 13, wherein the thread represents a connection between a client and a server, the method further comprising:
sending a message by the critical signal handler indicating that the connection has been closed.

22. A method of sustaining a multi-threaded process when a thread within the multi-threaded process crashes, the method comprising:
organizing a data space for each thread in a plurality of threads in the multi-threaded process such that each data space is substantially independent from the other data spaces;
executing a crash thread in the multi-threaded process, the crash thread processing one or more signals from an operating system the signals being associated with to a crashing thread in the multi-threaded process;
terminating the crashing thread by the crash thread, thereby releasing system resources and clearing connections associated with the crashing thread; and
allowing other threads in the multi-threaded process to continue functioning uncorrupted thereby preventing termination of the entire process.

23. A method as recited in claim 22 wherein the data space for each thread further includes a plurality of private structures internal to the thread such that a reduced amount of unused data is maintained by the thread.

24. A method as recited in claim 22 wherein executing a crash thread further includes registering critical signals in the process when the process is invoked thereby enabling the detection of the critical signals by the multi-threaded process.

25. A method as recited in claim 22 wherein executing a crash thread further includes making a function call to handle a particular critical signal wherein the function is a component of the crash thread.

26. A method as recited in claim 22 wherein executing a crash thread further includes reading a next incoming signal from a signal queue.

27. A method as recited in claim 22 wherein terminating the crashing thread further includes:
terminating all connections associated with the crashing thread;
deleting all references in memory to the crashing thread; and
closing all files associated with the crashing thread.

28. A method as recited in claim 22 wherein terminating the crashing thread further includes instructing an input polling thread contained in the multi-threaded process to discontinue detecting input events directed to the crashing thread.

29. The method as recited in claim 22, wherein terminating the crashing thread is performed by the crash thread.

30. A method as recited in claim 27 wherein deleting all references in memory to the crashing thread further includes:
clearing all data cells in a shared memory used exclusively by the crashing thread;
clearing all references to the crashing thread in other non-exclusive data cells in the shared memory; and
clearing any references to the crashing thread in a local process memory.

31. A computer system having a multi-threaded process capable of executing a plurality of active connection threads, the system comprising:
a critical signal thread arranged to detect a critical signal generated externally to the process and to handle termination operations for an offending one of the plurality of active connection threads associated with the critical signal without requiring termination of the entire process in response to the detected critical signal; and
a signal handler arranged to delete references to the offending thread in response to the critical signal and discontinue operations between the offending thread and files in the computer system while allowing other active connection threads within the process to continue operation;
whereby the computer system is arranged such that when a critical signal is generated for a particular offending active connection thread within the process, the other active connection threads continue operating within the process.

32. A computer system as recited in claim 31 wherein the signal handler is contained in the critical signal thread.

33. A computer system as recited in claim 31 further comprising a signal register for registering critical signals thereby enabling the critical signal thread to detect and process such critical signals.

34. A computer system as recited in claim 31 wherein the computer system includes a plurality of multi-threaded processes, the computer system further comprising a shared memory accessible by the plurality of multi-threaded process wherein the shared memory contains information on each thread in the plurality of threads.

35. A computer system as recited in claim 31 further comprising a signal queue arranged to temporarily store incoming signals before they are processed by the critical signal thread.

36. A computer system as recited in claim 31 further comprising an input polling thread contained within the process wherein the critical signal thread instructs the input polling thread to discontinue polling for input events directed to the offending thread.

37. A computer system as recited in claim 31 further comprising a core file generator arranged to generate a core file when the process receives a critical signal.

38. A computer-readable medium containing programming instructions for handling critical signals resulting from the execution of a thread in a multi-threaded process having a critical signal thread, the computer-readable medium comprising computer program code devices configured to cause a computer to execute the steps of:
detecting a critical signal caused by a particular thread in a particular multi-threaded process;
invoking a critical signal thread to handle the critical signal caused by the particular thread;
terminating by the critical signal thread resources and connections associated with the particular thread that caused the critical signal wherein other threads in the particular process are unaffected by the critical signal and the termination of the resources and connections of the particular thread; and allowing other threads in the particular process to remain functional.

39. A computer-readable medium as recited in claim 38 further including computer program code devices configured to register operating system signals thereby enabling the critical signal thread to detect the registered signals.

40. A computer-readable medium as recited in claim 38 wherein the computer program code devices configured to cause a computer to invoke a critical signal thread to handle the critical signal further includes computer program code devices configured to cause a computer to execute the step of executing a critical signal handler wherein the critical signal handler is a module in the critical signal thread.

41. A computer-readable medium as recited in claim 38 wherein the computer program code devices configured to cause a computer to terminate resources and connections associated with the particular thread that caused the critical signal further includes computer program code devices configured to cause a computer to execute the steps of:

closing files opened by the particular thread;

unlocking files locked by the particular thread; and sending an informational message to a client.

42. A computer-readable medium as recited in claim 38 wherein the computer program code devices configured to cause a computer to terminate resources and connections associated with the particular thread that caused the critical signal further include computer program code devices configured to cause a computer to execute the step of deleting references to the particular thread in a shared memory and clearing memory associated with the particular process of any references to the particular thread.

43. A computer-readable medium containing programming instructions for maintaining a multi-threaded process when a thread within the process crashes, the computer-readable medium comprising computer program code devices configured to cause a computer to execute the steps of:

organizing a data space for each thread in a plurality of threads in the multi-threaded process such that each data space is substantially independent from the other data spaces;

executing a crash thread in the multi-threaded process, the crash thread being adapted for processing one or more signals from an operating system the signals being directed to an offending thread in the multi-threaded process; and terminating the offending thread thereby releasing system resources and clearing connections associated with the offending thread;

wherein the other threads in the multi-threaded process are not corrupted and can continue functioning thereby preventing termination of the entire process.

44. A computer system having a multi-threaded process capable of executing a plurality of active connection threads, the system comprising:

a means for detecting a critical signal generated externally to the process and to handle termination operations for an offending one of the plurality of active connection threads associated with the critical signal without requiring termination of the entire process in response to the detected critical signal; and a means for deleting references to the offending thread in response to the critical signal and discontinuing operations between the offending thread and files in the computer system while allowing other active connection threads within the process to continue operation;

whereby the computer system is arranged such that when a critical signal is generated for a particular offending active connection thread within the process, the other active connection threads continue operating within the process.

45. A computer system as recited in claim 44 further comprising a means for registering critical signals thereby enabling the critical signal thread to detect and process such critical signals.

46. A computer system having a multi-threaded process capable of executing a plurality of active connection threads, the system comprising:

a means for detecting a critical signal caused by a particular thread in a particular multi-threaded process;

a means for invoking a critical signal thread to handle the critical signal caused by the particular thread; and a means for terminating resources and connections associated with the particular thread that caused the critical signal;

wherein other threads in the particular process are unaffected by the critical signal and the resulting termination of the resources and connections of the particular thread thereby allowing the other threads in the particular process to remain functional.

47. A computer system having a multi-threaded process capable of executing a plurality of active connection threads, the system comprising:

a means for organizing a data space for each thread in a plurality of threads such that each data space is substantially independent from the other data spaces;

a means for executing a crash thread in the process, the crash thread for processing signals from an operating system directed to an offending thread; and a means for terminating the offending thread thereby releasing system resources and clearing connections associated with the offending thread;

wherein the other threads in the multi-threaded process are not corrupted and can continue functioning thereby preventing termination of the entire process.

* * * * *